March 13, 1962 A. J. RIDER 3,024,539
TRAINER CONTROL COLUMN APPARATUS
Filed April 19, 1961 3 Sheets-Sheet 3

ALBERT J. RIDER
INVENTOR

BY Richard G. Stephens
ATTORNEY

United States Patent Office 3,024,539
Patented Mar. 13, 1962

3,024,539
TRAINER CONTROL COLUMN APPARATUS
Albert J. Rider, Greene, N.Y., assignor to Link Division of General Precision, Inc., Binghamton, N.Y., a corporation of Delaware
Filed Apr. 19, 1961, Ser. No. 104,059
5 Claims. (Cl. 35—12)

This invention relates to an improved arrangement for connecting the control wheel or joystick of a grounded flight trainer to transducers provided to measure displacements of such a simulated control, and more particularly, to a simple, more economical and yet still reliable trainer control column arrangement. In the grounded trainer art, it is necessary to provide means for measuring wheel or stick displacement in both the to-and-from or "elevator" sense and the side-to-side or "aileron" sense, in order to operate transducers, commonly electrical potentiometers, which provide computer voltages commensurate with deflections or displacements of the control from a neutral position. Because an aircraft control wheel is often both rotated (aileron motion) and simultaneously translated (elevator motion), connection of the transducers to measure such rotation and translation has been complex, frequently involving the use of expensive and complex yokes and linkage arrangements. A common expedient has been to carry one or both of the transducers on the control column and to allow it or them to be moved bodily as the control wheel is rotated and/or translated. It will be recognized that such an arrangement allowing bodily movement of the transducers complicates wiring, since slip rings or flexing wires, which are notoriously unreliable, must be provided to connect to the movable transducers. Thus it is an object of the present invention to provide an improved simple and economical control column arrangement which will allow separate operation of two transducers from rotation and translation of a shaft, while still allowing rigid mounting of the transducers to fixed structure.

The invention also includes provision of a cooperative and novel control loading arrangement of particular utility in a low cost trainer. Torsion spring means are mounted inside the trainer control column so that no extra space is required for the linkages or pressure cylinders sometimes used for aileron control loading. Furthermore, the use of a long torsion rod insures provision of a smoothly operating aileron control force not subject to the sticking or cogging which frequently affect systems using gears or linkages. Thus it is a further object of the invention to provide an improved trainer control column arrangement of the type described having a torsion rod aileron force-producing member.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in claims.

For a fuller understanding of the nature and objects of the invention reference should be had to the following detailed description taken in connection with the accompanying drawing, in which.

Figure 1:
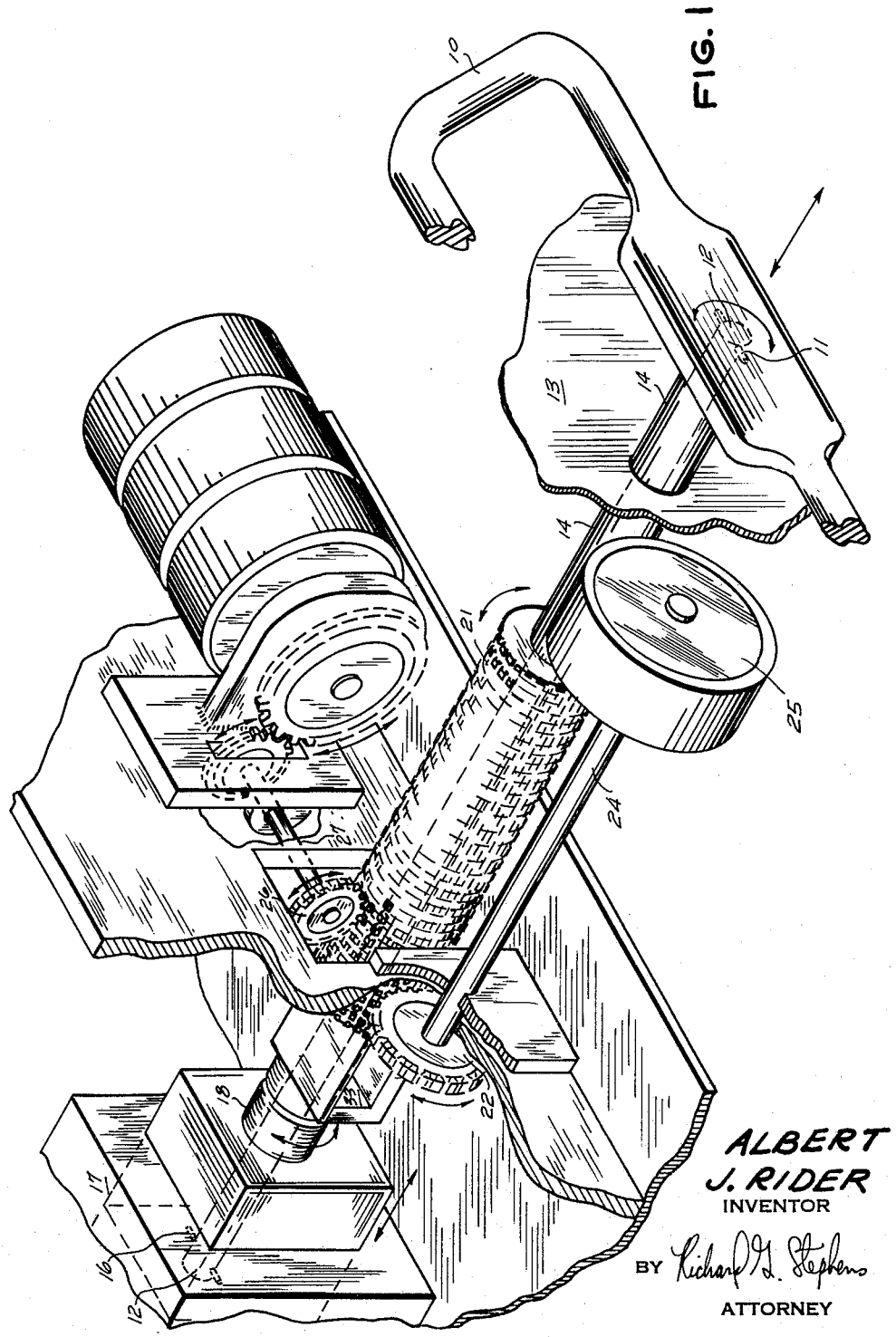
FIG. 1 is a perspective view, with certain parts shown partially cut away, illustrating an exemplary embodiment of a control column mechanical arrangement according to the invention.

Referring to the figures, wheel 10, shown partly cut away in FIG. 1, is rigidly connected, by means of embedded pin 11 to an inner torsion rod 12 which extends through dashboard 13 (shown largely cut away for convenience of illustrating) and down hollow pipe member 14, ultimately to anchor to fixed or grounded structure, pin 16 being shown embedded in non-rotatable, reciprocable block 18. Hollow pipe 14 extends from wheel 10 through dashboard 13, past a variety of members to be described, ultimately ending at bearing sleeve 18, relative to which pipe 14 is freely rotatable. The upper end of pipe 14 (FIG. 3) is rigidly fastened to wheel 10, pipe 14 being threaded into plate 48, which is held to wheel 10 by screws 55, 55, so that rotation of wheel 10 for simulated aileron control also rotates pipe 14, and so that elevator translation of wheel 10 translates pipe 14 and reciprocable block 18 in and out of stationary block 17.

Rigidly affixed to the outer periphery of pipe 14 is a generally cylindrical rack member 21 in which gear teeth have been hobbed in two directions As rotation of wheel 10 in aileron control fashion rotates member 21, one or more spur gears, such as gear 22 provided to mesh with member 21 are rotated, thereby rotating shafts, such as shaft 24, which are fixedly mounted or journalled in fixed trainer structure and capable of operating indicators such as 25 and electrical or mechanical elements such as potentiometers without bodily moving the devices. It will be apparent that the gear teeth should be hobbed along the length of cylinder member 21 for a distance long enough to accommodate the maximum contemplated elevator deflection.

As wheel 10 is moved to and from in normal elevator fashion further gears such as 26 will be rotated, thereby operating further fixedly journalled shafts such as 27, which may be connected to operate stationary apparatus. It will be seen that none of the potentiometers or switches, etc. need be moved bodily or connected by means of flexing wires or slip rings.

Because the lower or inner end of torsion rod 12 is connected to fixed structure at stationary block 17, and because reciprocable block 18 is non-rotatable, rotation of wheel 10 from a neutral position occurs against the torsion force of torsion rod 12. Because no radial arms or other linkages are required from the steering column as in most prior devices, much less space is required, and no cogging or nonlinearities occur over the operating range. The spring system applies force at a constant rate, and it is suitable for low-cost trainers in which variation of control forces as a function of dynamic pressure is not deemed economically justified.

Figure 2:
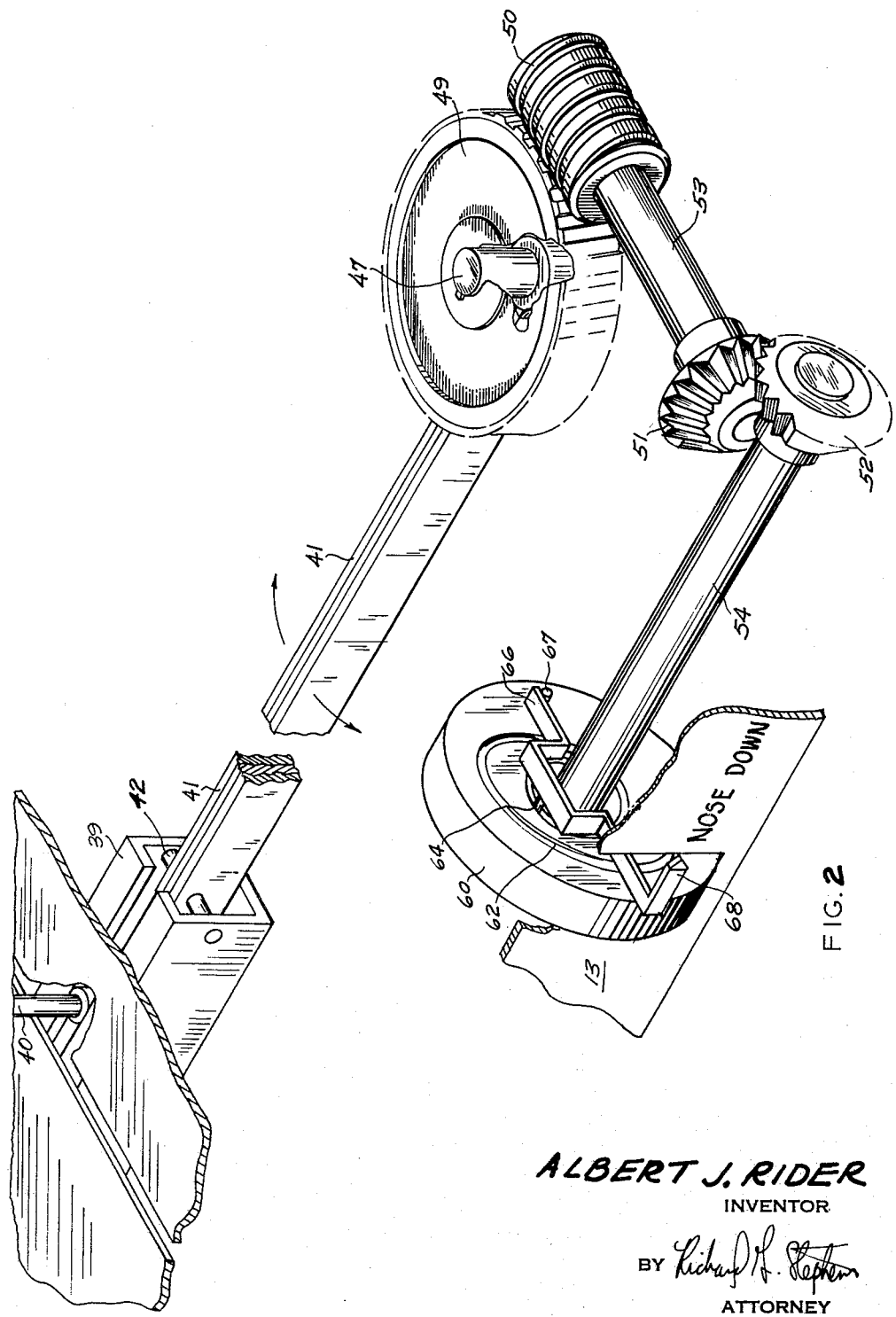
FIG. 2 is a perspective view, with certain parts cut away, of the elevator trim adjusting portion of the invention.

The elevator neutral position is determined by means (shown in FIGS. 2 and 3) which apply a centering force to tube 14 via connecting member 33. Block member 33 is journalled in bearings 34, 35 so as to allow free rotation of tube 14 with respect to member 33, but collars 36, 37 rigidly affixed to pipe 14 constrain member 33 to fixed longitudinal location on pipe 14, so that member 33 reciprocates (from right-to-left etc. as viewed in FIG. 3) as wheel 10 is moved in simulated elevator control motion. Reciprocation of member 33 likewise reciprocates member 39, which is pivotally attached to member 33 by means of pin 40. Pin 42 in lower block member 39 fixedly anchors one end of a spring means shown as comprising three leaf springs 41, 41. The spring means is rigidly attached, as by brazing, to shaft 47 which carries gear 49. Worm gear 50 and a mechanical operative connection shown as comprising bevel gears 51 and 52 and shafts 53 and 54 to rotatable simulated trim wheel 60, a portion of which extends through dashboard 13, as shown. It will be understood that rotatable shafts 47, 53 and 54 all are fixedly journalled (by means not shown) in fixed trainer structure and allowed to rotate only.

Figure 3:
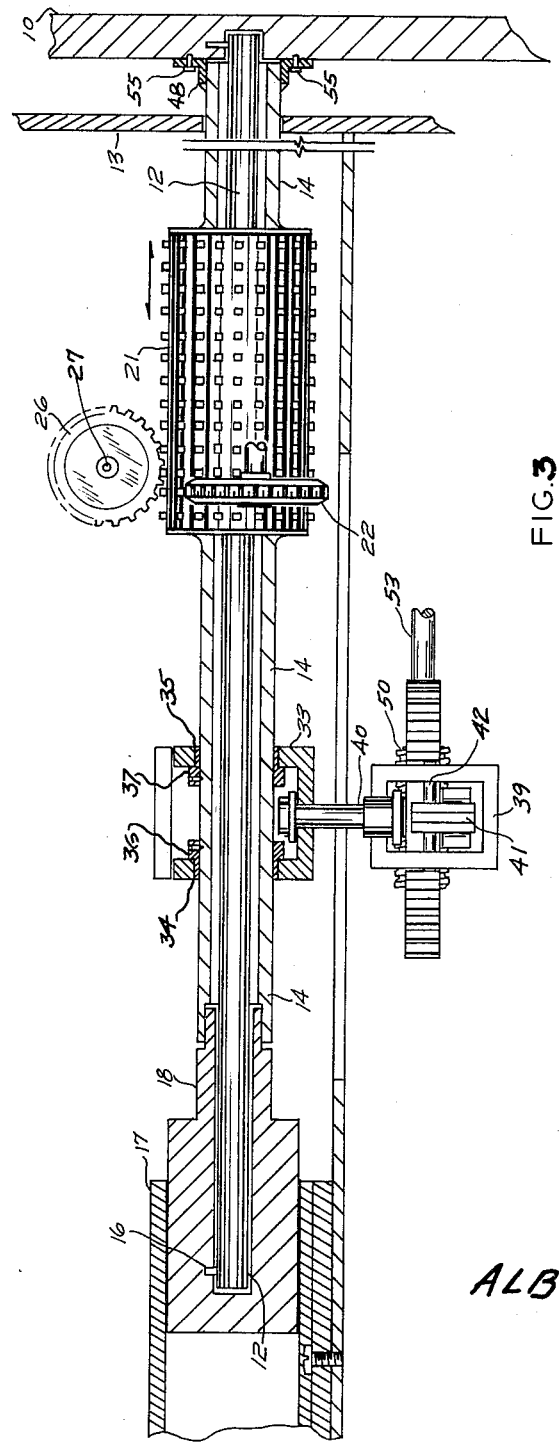
FIG. 3 is an elevation view useful in correlating FIGS. 1 and 2.

As the simulated trim wheel 60 is rotated, thereby rotating shaft 54, spiral cam groove 62 moves cam pin 64 and arm 66 inwardly and outwardly from the axis of rotation of wheel 60 and shaft 54, thereby pivoting spring arm 66 about pivot 67, but more importantly, thereby positioning pointer end 68 of arm 66 relative to trim position indicia painted on dashboard 13. Rotation of shafts 54, 53 and 47 bodily rotates spring means 41 about the axis of shaft 47, thereby urging block members 39 and 33, through spring means 41, to a desired neutral position. Thus it will be seen that the neutral elevator position, where spring means 41 is undeflected, will be selected by roattion of simulated elevator trim wheel 60. Because the distance between shaft 47 and block 33 necessarily must vary with elevator control position, lower block member 39 is slotted, as best seen in FIG. 3, to allow bolt 40 to reciprocate in the slot as simulated elevator position is changed.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic end specific features of the invention herein described, and all statements of the scope of the invention which, as a matter of language, might be said to fall therebetween.

Having described my invention, what I claim as new and desire to secure by Letters Patent is:

1. Simulated aircraft control means comprising: a control member, torsion rod means attached to said control member and journalled remotely therefrom so as to be translatable but not bodily rotatable, pipe means enclosing said torsion rod means and secured to said control means so as to be translatable with said control means and rotatable with said control means when said torsion rod means is torsionally flexed, and cylindrical rack means affixed to said pipe means and having gears meshing therewith for actuating transducer means.

2. Simulated aircraft control means comprising: a control member, torsion rod means attached to said control member and journalled remotely therefrom so as to be translatable but not bodily rotatable, pipe means enclosing said torsion rod means and secured to said control means so as to be translatable with said control means and rotatable with said control means when said torsion rod means is torsionally flexed, and cylindrical rack means affixed to said pipe means and having gears the axes of which are respectively substantially parallel and perpendicular to the axis thereof meshing therewith for actuating transducer means.

3. Simulated aircraft control means comprising: a control member, torsion rod means attached to said control member and journalled remotely therefrom so as to be translatable but not bodily rotatable, pipe means enclosing said torsion rod means and secured to said control means so as to be translatable with said control means and rotatable with said control means when said torsion rod means is torsionally flexed, and cylindrical rack means affixed to said pipe means and having gears the axes of which are respectively substantially parallel and perpendicular to the axis thereof meshing therewith for actuating potentiometer means.

4. Simulated aircraft control means comprising: a control member, torsion rod means attached to said control member and journalled remotely therefrom so as to be translatable but not bodily rotatable, pipe means enclosing said torsion rod means and secured to said control means so as to be translatable with said control means and rotatable with said control means when said torsion rod means is torsionally flexed, and bearing means affixed to said pipe means, said bearing means serving to translatably journal a first end of an extended, resilient means, the second end of said resilient means being affixed to means whereby the angular disposition thereof may be altered in response to the setting of simulated trim on a simulated trim control.

5. Simulated aircraft control means comprising: a control member, torsion rod means attached to said control member and journalled remotely therefrom so as to be translatable but not bodily rotatable, pipe means enclosing said torsion rod means and secured to said control means so as to be translatable with said control means and rotatable with said control means when said torsion rod means is torsionally flexed, and cylindrical rack means affixed to said pipe means and having gears meshing therewith for actuating transducer means, and means affixed to said pipe means and serving to translatably journal a first end of an extended, resilient means, the second end of said resilient means being affixed to means whereby the angular disposition thereof may be altered in response to the setting of simulated trim on a simulated trim control.

No references cited.